United States Patent
Farr et al.

(10) Patent No.: US 10,677,130 B2
(45) Date of Patent: Jun. 9, 2020

(54) METHODS FOR DETECTING A DOSING ERROR

(71) Applicant: Robert Bosch GmbH, Stuttgart (DE)

(72) Inventors: Thomas Farr, Ludwigsburg (DE); Claus Linsenmaier, Kirchheim Unter Teck (DE)

(73) Assignee: Robert Bosch GmbH, Stuttgart (DE)

( * ) Notice: Subject to any disclaimer, the term of this patent is extended or adjusted under 35 U.S.C. 154(b) by 200 days.

(21) Appl. No.: 15/631,432

(22) Filed: Jun. 23, 2017

(65) Prior Publication Data

US 2018/0010502 A1      Jan. 11, 2018

(30) Foreign Application Priority Data

Jun. 27, 2016   (DE) .................. 10 2016 211 530
Jun. 20, 2017   (DE) .................. 10 2017 210 250

(51) Int. Cl.
*F01N 3/10*      (2006.01)
*F01N 3/20*      (2006.01)
*F01N 11/00*    (2006.01)

(52) U.S. Cl.
CPC .............. *F01N 3/208* (2013.01); *F01N 3/10* (2013.01); *F01N 11/002* (2013.01); *F01N 3/2066* (2013.01); *F01N 2550/05* (2013.01); *F01N 2560/07* (2013.01); *F01N 2900/1404* (2013.01); *F01N 2900/1602* (2013.01);
(Continued)

(58) Field of Classification Search
CPC .......... F01N 11/002; F01N 3/10; F01N 3/208; F01N 2550/05; F01N 2560/07; F01N 2900/1404; F01N 2900/1602; F01N 2900/1808; F01N 2900/1812;
(Continued)

(56) References Cited

U.S. PATENT DOCUMENTS 5,709,080 A  *  1/1998  Arora ................... F01N 3/2066
                                                             60/274
9,021,791 B2 *  5/2015  Barcin ..................... F01N 3/18
                                                             60/274
(Continued)

FOREIGN PATENT DOCUMENTS

DE   102009000061   7/2010
DE   102013218553   3/2015

*Primary Examiner* — Matthew T Largi
(74) *Attorney, Agent, or Firm* — Michael Best & Friedrich LLP (57) ABSTRACT

A method for detecting a dosing error of a reduction agent in a dosing module of an SCR catalytic converter system. The SCR catalytic converter system comprises the dosing module, which has a dosing valve and a flow valve as well as a delivery module with delivery pump. The SCR catalytic converter system, furthermore, has a return, in which a further flow valve is arranged. Said flow valve changes an effective cross-sectional area of the return. The method herein comprises the following steps: at the beginning, the dosing valve is closed (200). At a first pressure value ($p_1$) in the system the delivery pump is switched off (201) and a measurement (202) of a first pressure rate ($\bar{\beta}_{RL}^{dynamic}$) of the flow valve of the return subsequently takes place. Additional operation of the pump and the dosing valve occurs and a ratio of pressure rates is determined.

11 Claims, 7 Drawing Sheets

(52) U.S. Cl.
CPC .......... *F01N 2900/1808* (2013.01); *F01N 2900/1812* (2013.01); *F01N 2900/1821* (2013.01); *F01N 2900/1822* (2013.01); *Y02T 10/47* (2013.01)

(58) Field of Classification Search
CPC ..... F01N 2900/1821; F01N 2900/1822; F01N 3/2066
See application file for complete search history.

(56) References Cited

U.S. PATENT DOCUMENTS

| | | | |
|---|---|---|---|
| 9,617,885 B2* | 4/2017 | Dyrbusch | F01N 3/10 |
| 10,012,198 B2* | 7/2018 | Hoss | F02M 63/0052 |
| 2005/0251318 A1* | 11/2005 | Wickert | B01D 53/90 |
| | | | 701/108 |
| 2006/0086084 A1* | 4/2006 | Gerlach | B01D 53/90 |
| | | | 60/286 |
| 2009/0188309 A1* | 7/2009 | Hartimath | F01N 3/208 |
| | | | 73/114.76 |
| 2009/0192732 A1* | 7/2009 | Huebner | F01N 11/00 |
| | | | 702/50 |

* cited by examiner

METHODS FOR DETECTING A DOSING ERROR

BACKGROUND OF THE INVENTION

The present invention relates to methods for detecting a dosing error of a reduction agent in a delivery module of an SCR catalytic converter system. The present invention, furthermore, relates to a computer program which carries out every step of the methods according to the invention when it is executed on a computer, and to a machine-readable storage medium, which stores the computer program. Finally, the invention relates to an electronic control unit, which is equipped in order to carry out the methods according to the invention.

Today, the SCR (selective catalytic reduction) method is utilized in the aftertreatment of exhaust gases in order to reduce nitrogen oxides (NOx) in the exhaust gas. The SCR method is predominantly employed in motor vehicles. There, a urea-water solution (HWL), commercially also known as AdBlue®, is introduced into the oxygen-rich exhaust gas. For this purpose, a dosing module is used which comprises a nozzle in order to spray the HWL into the exhaust gas flow. Moreover, a dosing valve is implemented which can control the flow through the dosing module. In the SCR catalytic converter system, the HWL reacts to form ammonia which subsequently bonds with the nitrogen oxides, from which water and nitrogen is created. The HWL is pumped via a delivery module from a tank to the dosing module. In addition, the delivery module is connected to the tank via a return so that excess HWL can be returned. An orifice plate or choke in the return controls the return flow.

The supplied quantity of HWL in the exhaust gas has consequences for the functioning of the SCR catalytic converter system. For this reason, a dosing error of the HWL influences the nitrogen oxide emission.

DE 10 2009 000 061 A1 relates to a method for reducing quantity tolerances of a dosing device of an SCR catalytic converter system. Because of aging, errors in the reagent dosing occur in the dosing device. These errors manifest themselves in over- and under-dosing of the reduction agent, which in turn leads to an infringement of the emission limits. With the help of the described method it is possible to detect deviations between the demanded target quantities and the actual quantities dosed and to take these into account by way of suitable regulating in a control unit, which then corrects the dosing quantities by way of activation intervals of a dosing pump. The basic idea of the method is to detect the mass flow of the reagent in the reagent pressure line, for example between the dosing pump and a dosing nozzle.

DE 10 2013 218 553 A1 relates to a method for operating a hydraulic delivery and dosing system for an SCR catalytic converter system. For the dosing to suit requirement a delivery pump of such a system delivers a desired or required quantity of reagent solution from a tank. The reagent solution is fed in a system pressure region into a pressure line and is sprayed into the exhaust gas system via a dosing unit, which can comprise one or a plurality of dosing valves. The system therefore has to be operated at a preset system pressure or in a presettable system pressure range. In the method it is provided that even during a pressure build-up in the system the pressure profile is subjected to a plausibility check to determine if a substantially continuous pressure increase is detectable. Thus, the pressure build-up is continuously monitored and evaluated, so that an error in the system can be very quickly detected.

SUMMARY OF THE INVENTION

Methods are disclosed in which a dosing error of a reduction agent in a delivery module of an SCR catalytic converter system is detected. The SCR catalytic converter system comprises a dosing valve having a flow resistance, a delivery pump in said delivery module and a return between the delivery module and a reduction agent tank. In the return, a flow valve is arranged which offers a local flow resistance and thus changes an effective cross-sectional area of the return. For example, this flow valve can be an orifice plate or a choke which is arranged in the return.

The method comprises the following steps: a closed dosing valve serves as starting point. Should the dosing valve, for example because of a dosing request, be open, it is closed at the start. When in the system a pressure corresponding to a first pressure value is present, the delivery pump is switched off. The reduction agent flows through the return and the flow valve, as a result of which the pressure in the system is diminished. This pressure rate of the flow valve of the return is now measured. Following this, the delivery pump is switched on again so that the pressure in the system is built-up anew.

In a case, described as dynamic in the following, the delivery pump is switched off again and the dosing valve opened at the same time or subsequently as soon as the pressure in the system has again reached the first pressure value. Here, the dosing valve remains open until the pressure has fallen to a second pressure value. Alternatively, this process takes place invertedly in a case described as static in the following and the dosing valve is open even before the delivery pump is switched off. In both cases, the reduction agent, in the same manner as previously, flows through both the return of the flow valve as well as through the dosing valve. A second pressure rate can now be measured when the dosing valve is open.

It must be noted that the shown sequence of the process is not intended to have a restrictive effect on the scope of protection of the invention. On the contrary, the sequence of the performed measurements can be considered arbitrary for as long as their prerequisites are fulfilled, in other words at one of the measurements the dosing valve is closed, at the respective other measurement the dosing valve is open. Apart from this, both measurements commence at the same pressure and the delivery pump is switched off during both measurements.

Finally, a ratio of the two pressure rates is calculated. From this, an actual volumetric flow rate of the reduction agent through the dosing valve is determined and checked.

Particularly advantageously, the delivery pump is switched off at both measurements of the pressure rates so that when the delivery pump is a rotating pump, same comes to a halt at the same angle of rotation in each case and, when the delivery pump is a linearly driven delivery pump, such as for example a lift pump with magnet, same, prior to being switched off, performs the same stroke, preferentially a full stroke. Because of this, artifacts regarding the delivery pump can be reduced when calculating the ratio of the pressure rates, as a result of which more accurate information can be derived from the ratio.

It is particularly preferred that the flow valve in the return, which changes an effective cross-sectional area of the return, corresponds to a flow valve in the dosing module. This provides the advantage that the ratio of the pressure rates and a ratio of the effective cross-sectional areas between return and dosing valve coincide.

Preferentially, a mean relative pressure rate is used for calculating the pressure rate. Optionally, a mean absolute pressure rate can be used by approximation for calculating the pressure rate. In both cases, the pressure rates, for minimizing tolerances of the method, are averaged by way of the pressure range used. In the case of an orifice plate, the pressure rates are proportional to the root of the pressure. Consequently, when averaging, a weight factor for the mean relative pressure rate advantageously materializes. Using the mean absolute pressure rate, this weight factor is not required, as a result of which additional numerical tolerances can develop.

According to a further development of the method, the delivery pump is switched off slowly, typically within 100 ms to 300 ms and the dosing valve slowly opened, likewise typically within 100 ms to 300 ms. The exact times depend on system characteristics and are selected so that pressure pulsations, for example due to pressure surges, are avoided as far as possible.

Optionally, an additional dosing quantity, which during the measurement of the pressure rates flows through the dosing valve, can be taken into account in a further dosing strategy. Because of this, quantity deviations due to the method can be reduced.

The computer program is equipped to carry out every step of the method, in particular when it is executed on a computer or control unit. It makes possible implementing the method in a conventional electronic control unit without having to perform structural changes to same. To this end, it is stored on the machine-readable storage medium.

By uploading the computer program onto a conventional electronic control unit, the electronic control unit according to invention is obtained, which is equipped in order to detect the dosing error of a reduction agent in the delivery module of the SCR catalytic converter system.

BRIEF DESCRIPTION OF THE DRAWINGS

Exemplary embodiments of the invention are shown in the drawings and are explained in more detail in the following description. In the figures.

DETAILED DESCRIPTION

Figure 1:
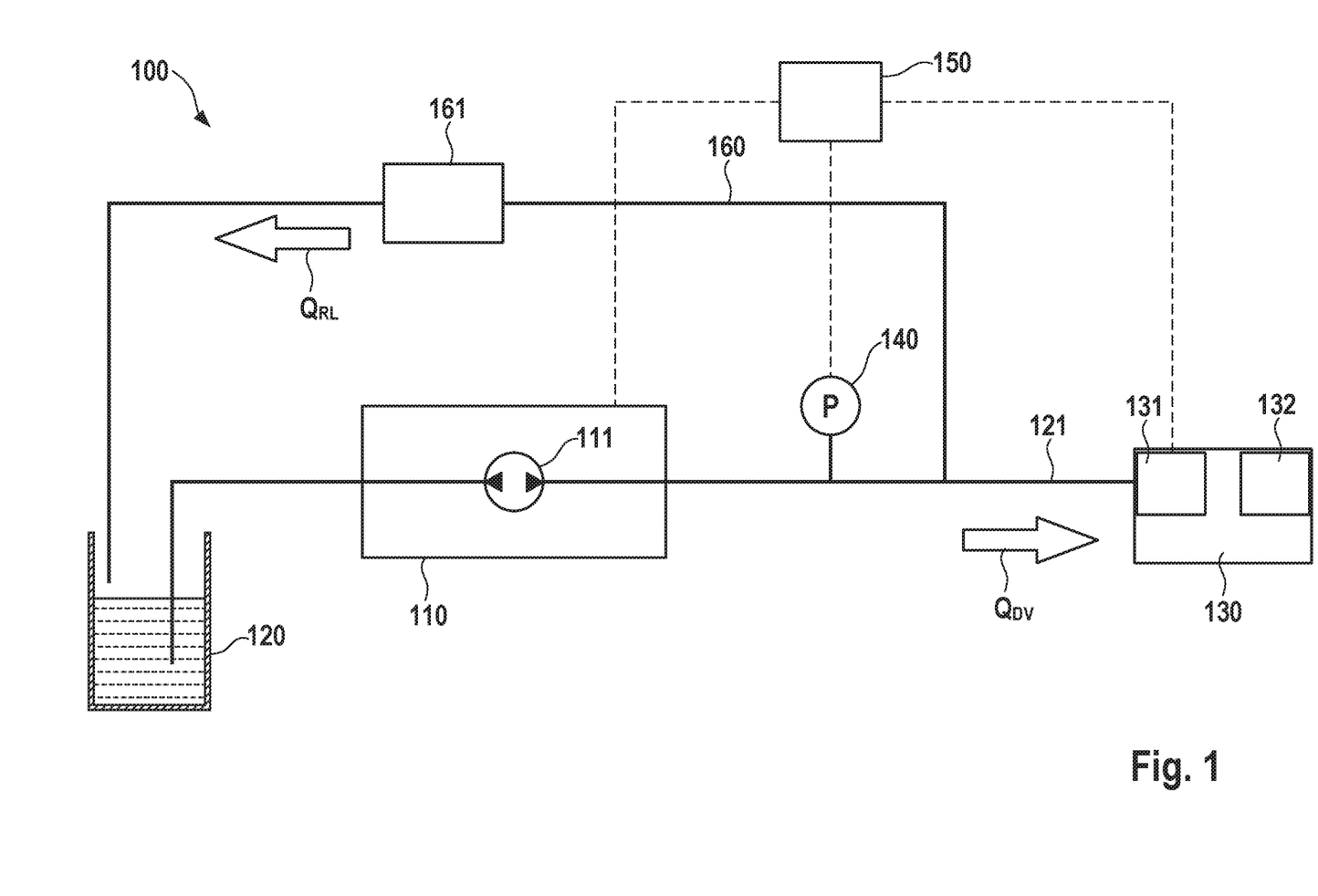
FIG. 1 schematically shows a reduction agent delivery system of an SCR catalytic converter system, in which a dosing error can be detected by means of an exemplary embodiment of the method according to the invention.

A reduction agent delivery system 100 of an SCR catalytic converter system (not displayed) is shown in FIG. 1. It comprises a delivery module 110, which comprises a rotating delivery pump 111, which is equipped to deliver reduction agent from a reduction agent tank 120 via a pressure line 121 into a dosing module 130, where the reduction agent is then sprayed into an exhaust gas system which is not shown. Additionally, the dosing module 130 comprises a dosing valve 131 which can be opened or closed and which controls the reduction agent flow to the dosing valve 130 and an orifice plate 132, which changes a volumetric flow rate $Q_{DV}$ of the reduction agent through the dosing module 130. Furthermore, a pressure sensor 140 is arranged in the reduction agent delivery system 100 and equipped to measure a pressure p between delivery module 110 and dosing module 130 over a period of time. An electronic control unit 150 is connected to the pressure sensor 140 and receives information regarding the pressure p in the system 100 from same. In addition, the electronic control unit 150 is connected to the delivery module, including the delivery pump 111, and to the dosing module 130, including dosing valve 131, and can control these.

In addition to this, the reduction agent delivery system 100 comprises a return 160, through which reduction agent conducted from the system back into the reduction agent tank 120. In this return 160, an orifice plate 161 is arranged which offers a local flow resistance and to that effect reduces an effective cross-sectional area $A_{eff}$ of the return 160 in size.

A volumetric flow rate $Q_{RL}$ of the reduction agent through the return 160 is regulated by the orifice plate 161 and can be calculated by way of the flow law for orifice plates, which is as follows:

$$Q_{RL} = A_{eff} \sqrt{\frac{2}{\rho}} \cdot \sqrt{\Delta p(t)} \qquad \text{(Formula 1)}$$

Here, $A_{eff}$ as mentioned above, is the effective cross-sectional area of the orifice plate 161, $\rho$ stands for a density of the reduction agent and $\Delta p$ for a pressure differential upstream and downstream of the orifice plate 161. It should be noted that the volumetric flow rate $Q_{RL}$ depends on the root of the pressure differential $\Delta p$.

The orifice plate 132 in the dosing module 130 and the orifice plate 161 in the return 160 function identically and the orifice plate 132 in the dosing module 130 influences the flow behavior of the volumetric flow rate $Q_{DV}$ through the dosing valve 131 in the same manner, analogously to Formula 1, as the orifice plate 161 in the return 160 influences the volumetric flow rate $Q_{RL}$ through the return 160.

In a further embodiment, a choke as flow valve can be arranged in the dosing module 130 and in the return 160. In this case, the volumetric flow rate $Q_{RL}$ through the return 160 is calculated by way of the flow law for chokes. Here, the volumetric flow rate $Q_{RL}$ is proportional to the pressure differential Δp. Here, too, both chokes function in the same manner and influence the flow behavior of the volumetric flow rates $Q_{DV}$ and $Q_{RL}$ in the same manner.

For determining a dosing of the reduction agent in the dosing module 130, a volumetric flow rate $Q_{DV}$ of the reduction agent through the dosing valve 131 is utilized. In the following, the relationship between a volumetric flow rate Q and a change of the pressure p in the system 100 will be shown. For the calculation, we utilize a relative pressure rate β which is obtained as follows from the change in the pressure over time dp(t)/d t:

$$\beta = \frac{1}{\sqrt{p(t)}} \frac{dp(t)}{dt} \quad \text{(Formula 2)}$$

The change in the pressure over time dp(t)/dt can be expressed by Formula 4 via a change in volume over time dV(t)/dt and a stiffness κ according to Formula 3:

$$\kappa = V \frac{dp(t)}{dV(t)} \quad \text{(Formula 3)}$$

$$\frac{dp(t)}{dt} = \frac{dp(t)}{dV(t)} \cdot \frac{dV(t)}{dt} = \frac{1}{V} \cdot V \cdot \frac{dp(t)}{dV(t)} \cdot \frac{dV(t)}{dt} = \frac{\kappa}{V} \frac{dV(t)}{dt} \quad \text{(Formula 4)}$$

According to the continuity equation (Formula 5), the change in volume over time dV(t)/dt occurs throughout the volumetric flow rate $Q_{ges}$. In the event that only the orifice plate 161 is open in the return 160, the total volumetric flow rate $Q_{ges}$ corresponds to the volumetric flow rate $Q_{RL}$ through the orifice plate 161.

$$\frac{dV(t)}{dt} = -Q_{ges} = -Q_{RL} \quad \text{(Formula 5)}$$

When the volumetric flow rate $Q_{RL}$ through the orifice plate 161 is calculated, Formula 5 and Formula 1 are inserted in Formula 3 and the result rearranged according to Formula 2. By way of this an expression for the relative pressure rate β is obtained via the characteristic quantities of the orifice plate 161:

$$\beta = -\frac{\kappa}{V} A_{eff} \sqrt{\frac{2}{\rho}} \quad \text{(Formula 6)}$$

For better calculation, the relative pressure rate β is averaged from a lowest pressure $p_l$ to a highest pressure $p_h$ according to Formula 7 in order to obtain a mean relative pressure rate $\bar{\beta}$.

$$\bar{\beta} = \frac{1}{p_h - p_l} \int_{p_l}^{p_h} \beta(p) dp \quad \text{(Formula 7)}$$

In the application case, the integral is not analytically calculated, rather a numerical approximation is performed. Here, the integral is expressed via a corresponding Riemann sum:

$$\bar{\beta} = \frac{1}{p_h - p_l} \sum_{j=l}^{h-1} \beta(p_j) \cdot (p_{j+1} - p_j) \quad \text{(Formula 8)}$$

For the following exemplary embodiments, the following configuration of the reduction agent delivery system 100 is used:
- the delivery module 110 is designed for a maximum mass flow of the dosing module 130 of 10 kg of reduction agent per hour;
- the dosing module 130 is designed for a maximum mass flow of 7.2 kg of reduction agent per hour, which is injected into the exhaust gas system;
- the pressure line 121 is 475 cm long and has an inner diameter of 6 mm and is manually vented after pressure build-up;
- the method is carried out at room temperature.

Figure 2:
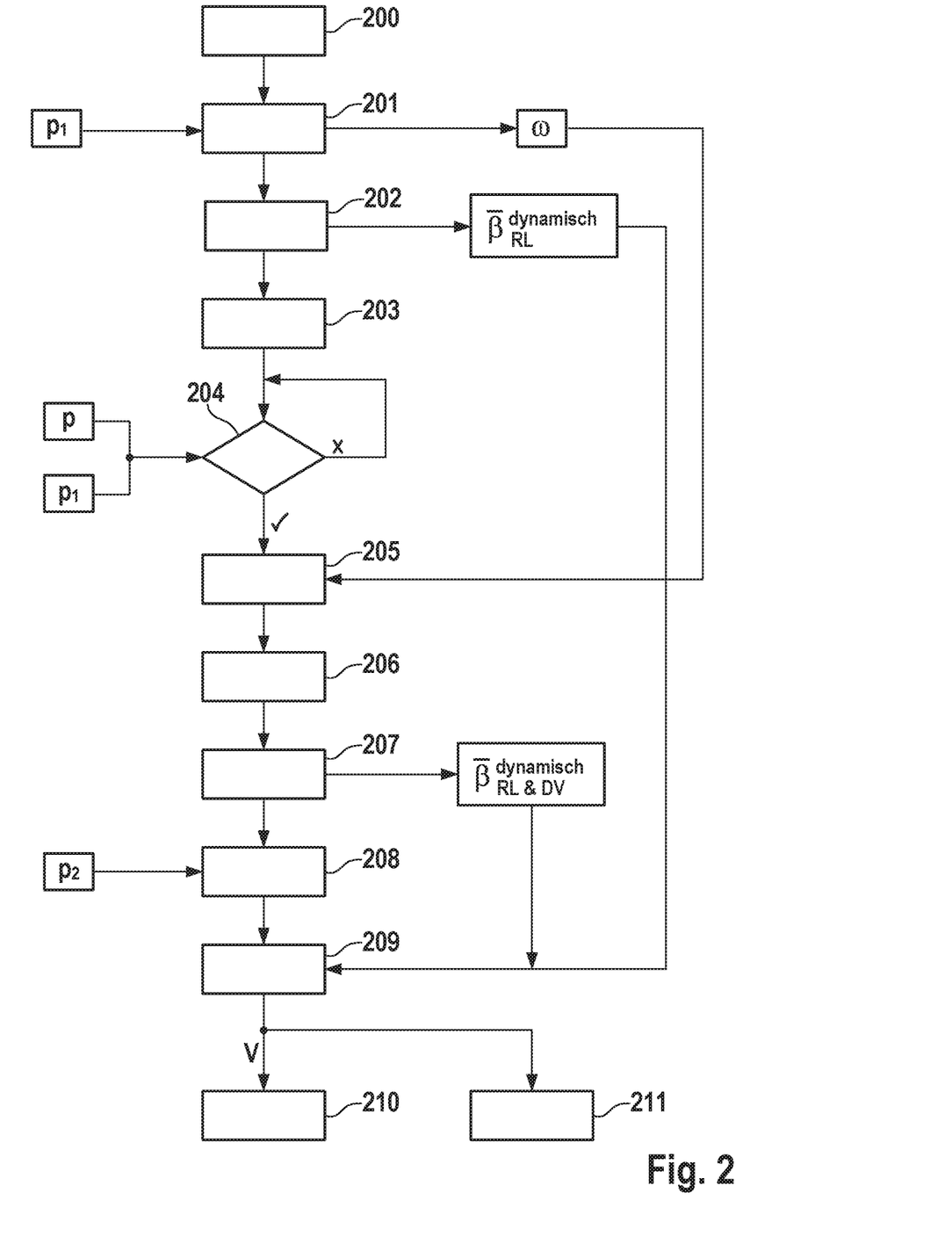
FIG. 2 shows a flow diagram of an exemplary embodiment of the method according to the invention.

FIG. 2 shows a flow diagram of an exemplary embodiment of the method according to the invention, which is described as the dynamic case in the following. At the beginning, a closing 200 of the dosing valve 131 takes place. At a fixed pressure $p_1$, a switching-off 201 of the delivery pump 111 takes place, wherein the rotating delivery pump 111 is switched off within 200 ms and comes to a halt at a fixed angle of rotation ω. Directly following this, a measurement 202 of the mean relative pressure rate $\bar{\beta}_{RL}^{dynamic}$ of the return 160 is carried out. When the measurement 202 has been concluded, the delivery pump 111 is switched on 203 again and the pressure p in the system 100 rises. As a consequence of a query 204 it is determined when the pressure p again reaches the fixed pressure value $p_1$. If this is the case, the delivery pump 111 is switched off 205 again. Here, too, the switching-off 205 of the delivery pump 111 takes place within 200 ms and the delivery pump 111 comes to a halt at the same angle of rotation ω. Directly following this, the dosing valve 131 is opened 206 within 200 ms and a renewed measurement 207 of the mean relative pressure rate $\bar{\beta}_{RL\ \&\ DV}^{dynamic}$ of the return 160 and of the dosing valve 131 carried out. When the measurement 207 has been concluded, the dosing valve 131 is closed 208 again.

Since the return 160 and the pressure line 121, which leads to the dosing module 130, are connected, the pressure p in both lines is identical. For this reason, the two mean relative pressure rates $\bar{\beta}_{RL}^{dynamic}$ and $\bar{\beta}_{RL\ \&\ DV}^{dynamic}$ can be compared with one another. As explained previously, the relative pressure rate β, and thus also the mean relative pressure rate $\bar{\beta}$, is dependent on the volumetric flow rate Q. In a further step, a calculation 209 of a ratio V between both volumetric flow rates $Q_{RL}$ and $Q_{RL\&DV}$ according to Formula 9 takes place in that a quotient of the two mean relative pressure rates $\bar{\beta}_{RL}^{dynamic}$ and $\bar{\beta}_{RL\ \&\ DV}^{dynamic}$ is formed.

$$V = \frac{\bar{\beta}_{RL}^{dynamic}}{\bar{\beta}_{RL\ \&\ DV}^{dynamic}} = \frac{Q_{RL}}{Q_{RL\ \&\ DV}} \quad \text{(Formula 9)}$$

In conclusion, a checking 210 of the actual volumetric flow rate $Q_{DV}$ through the dosing valve via the calculated ratio V takes place. Furthermore, the quantity which to a minor extent is additionally dosed in is taken into account 211 in a further dosing strategy.

Figure 3A:
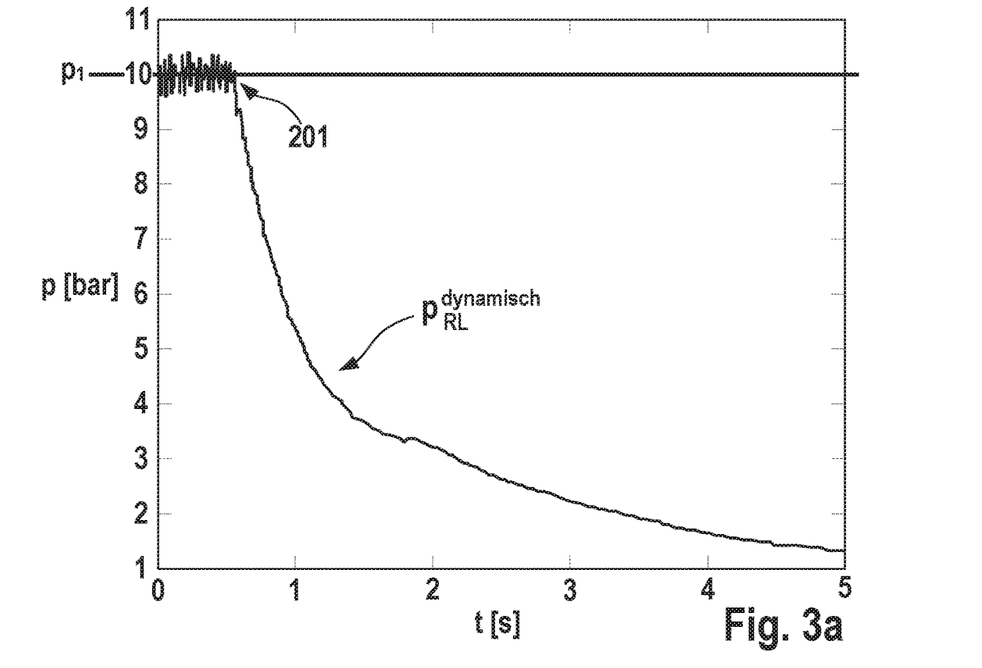
FIG. 3a shows a diagram of the pressure over the time according to an embodiment of the method according to the invention, wherein a dosing valve in the dynamic case is closed.
Figure 3B:
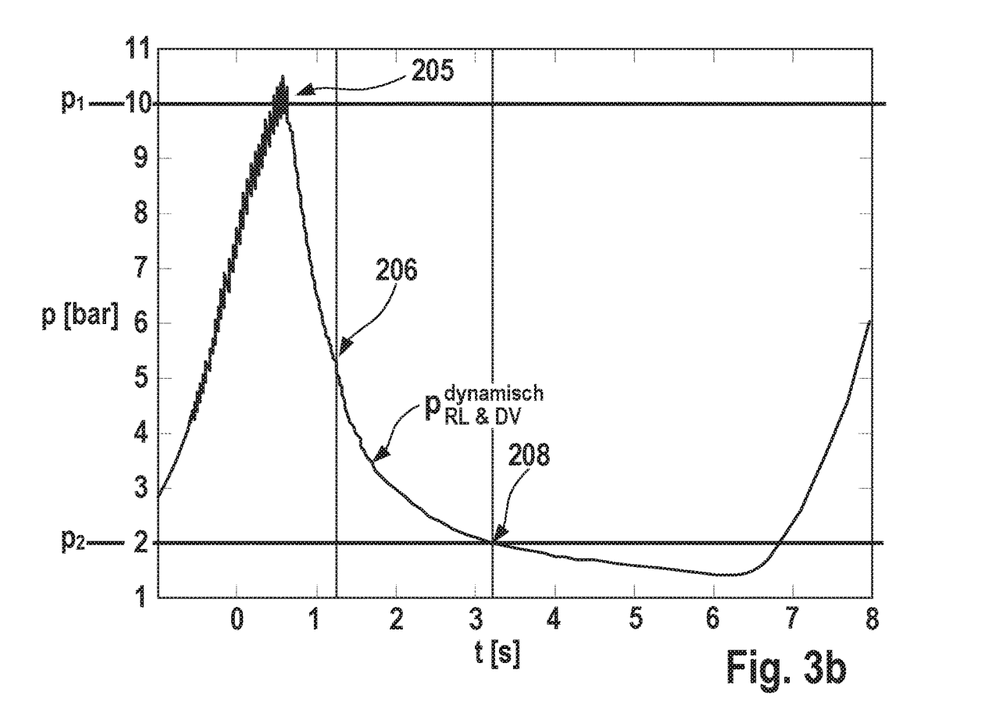
FIG. 3b shows a diagram of the pressure over the time according to an embodiment of the method according to the invention, wherein the dosing valve in the dynamic case is open after the delivery pump has been switched off.

FIGS. 3a and 3b represent the profile of the pressure p over time in the reduction agent delivery system 100 for the above described dynamic case. In FIG. 3a, the dosing valve 131 is closed and the pressure $p =_{RL}^{dynamic}$ is exclusively reduced via the return 160. Once the delivery pump 111 has been switched off 201 at a pressure $p_1$, it comes to a halt 201 at approximately 0.7 seconds. Following this, the pressure $p =_{RL}^{dynamic}$ shows a reciprocal profile that is characteristic for an orifice plate.

FIG. 3b shows the profile of the pressure $p =_{RL \ \& \ DV}^{dynamic}$ with opened dosing valve 131. Here, the delivery pump 111 likewise comes to a halt 205 at approximately 0.7 seconds. At approximately 1.3 seconds, the dosing valve 131 is opened 206 and the pressure $p =_{RL \ \& \ DV}^{dynamic}$ can now be reduced both via the return 160 and also via the opened dosing valve 131. As a result of this, the reciprocal profile, compared with FIG. 3a, is changed. The measurement 207 of the mean relative pressure rate $\bar{\beta}_{RL \ \& \ DV}^{dynamic}$ with open dosing valve 131 takes place over a period of time of approximately 2 seconds until the dosing valve subsequently is closed 208 again as soon as the pressure p has reached a second pressure valve $p_2$.

Figure 4A:
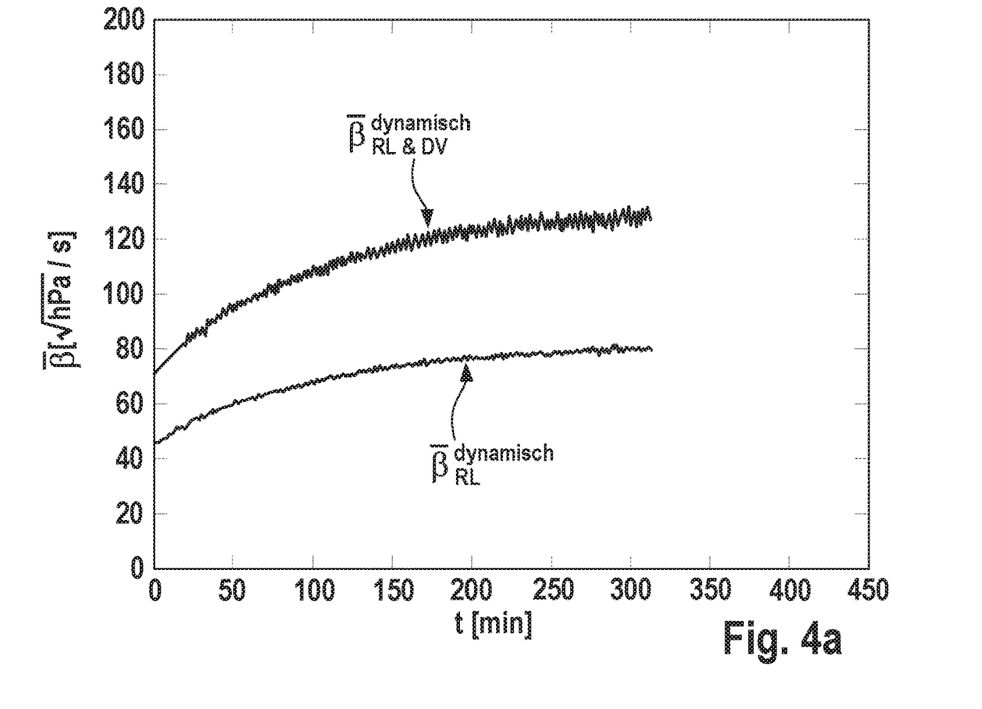
FIG. 4a shows a diagram of the mean pressure rates with closed and open dosing valve over the time according to an embodiment of the method according to the invention for the dynamic case, in the case of which the dosing valve is not blocked.
Figure 4B:
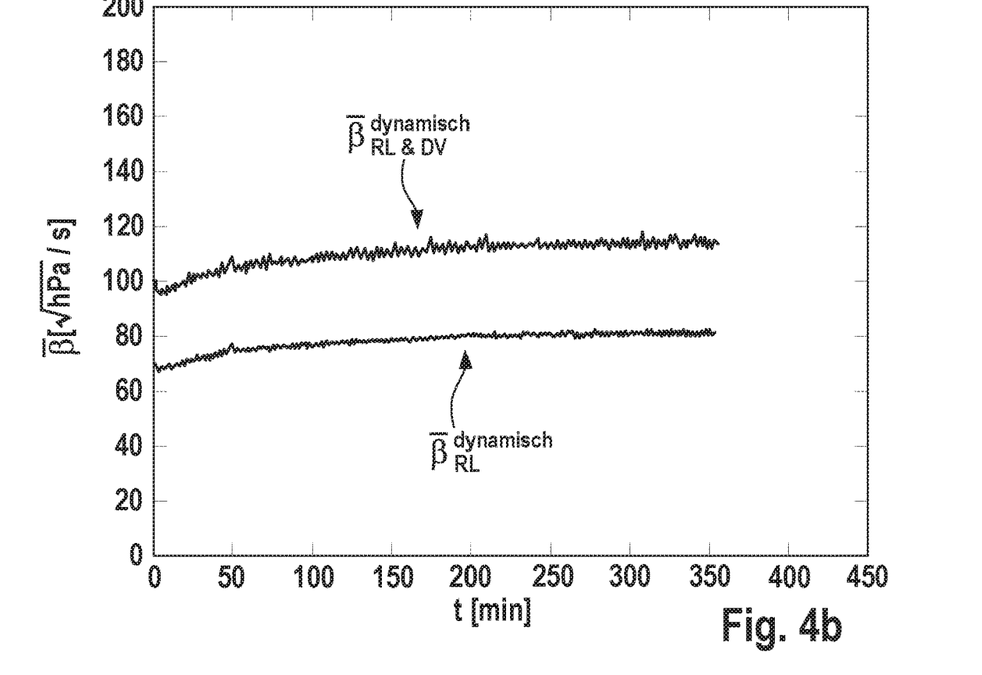
FIG. 4b shows a diagram of the mean pressure rates with closed and open dosing valve over the time according to a further embodiment of the method according to the invention for the dynamic case, in the case of which the dosing valve is partly blocked.

In FIGS. 4a and 4b, the two mean relative pressure rates $\bar{\beta}_{RL}^{dynamic}$ and $\bar{\beta}_{RL \ \& \ DV}^{dynamic}$ are respectively represented over an extended measurement duration of up to six hours, wherein the curve is constructed from the measurement points of the respective individual measurements according to the method in the dynamic case according to the invention. FIG. 4a shows a configuration in which the dosing valve 131 is not blocked. Here it is easily detectable that the mean relative pressure rate $\bar{\beta}_{RL \ \& \ DV}^{static}$ of the return 160 and of the dosing valve 131 lies above the mean relative pressure rate $\bar{\beta}_{RL}^{static}$ return 160. It is noted, furthermore, that the ratio of both profiles approximately coincides. From this it can be inferred that the volumetric flow rate $Q_{DV}$ through the dosing valve 131 remained constant over this time and as a result the dosing did not exhibit any errors either.

FIG. 4b otherwise shows a configuration in which a third of the dosing valve 131 is blocked. Furthermore, the mean relative pressure rate $\bar{\beta}_{RL \ \& \ DV}^{dynamic}$ of the return 160 and of the dosing valve 131 lies above the mean relative pressure rate $\bar{\beta}_{RL}^{dynamic}$ of the return 160. However it is noticeable that the relative interval is smaller, which points to a smaller volumetric flow rate $Q_{DV}$ through the dosing valve 131.

Figure 5:
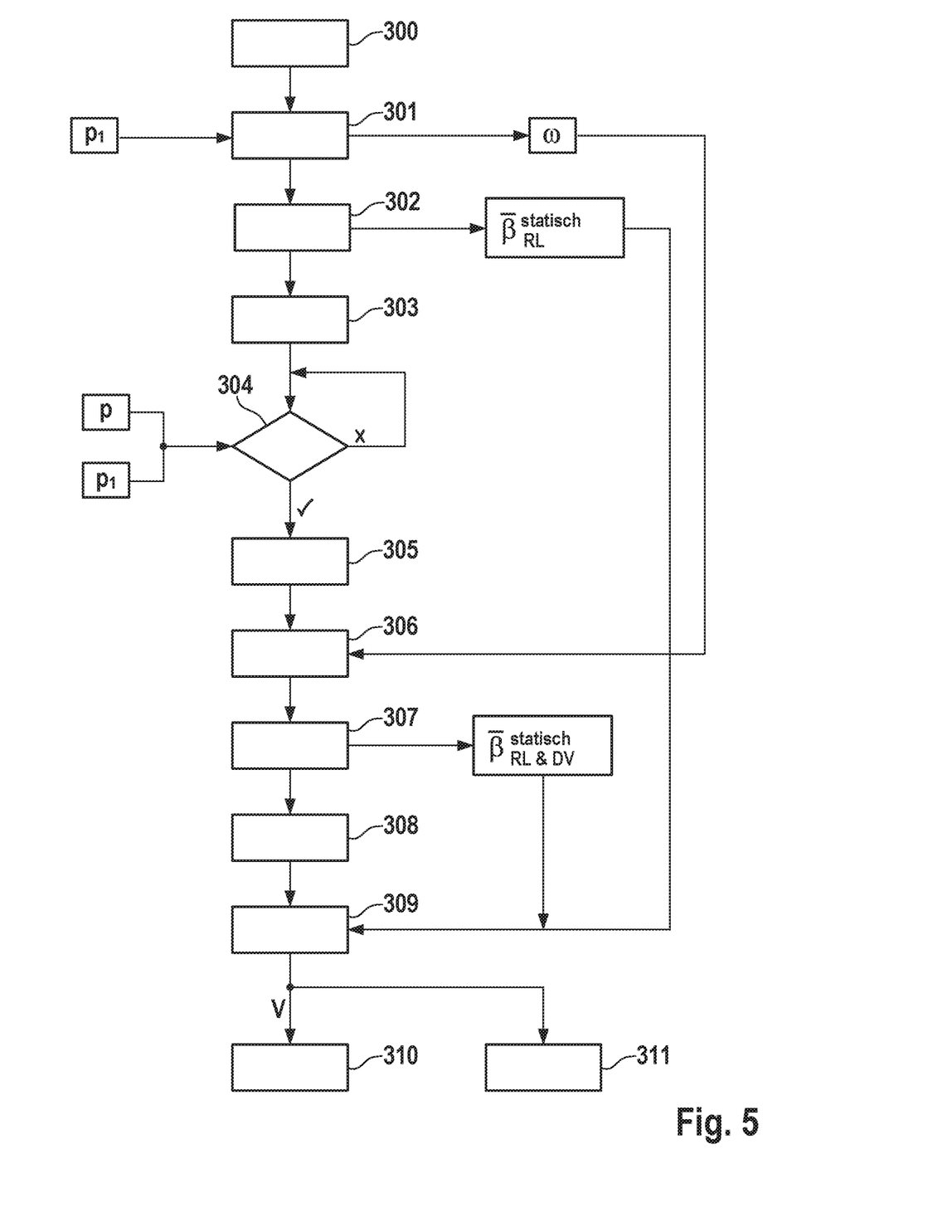
FIG. 5 shows a flow diagram of a further exemplary embodiment of the method according to the invention.

FIG. 5 represents a flow diagram of a further exemplary embodiment of the method according to the invention, which in the following is described as the static case. At the beginning, a closing 300 of the dosing valve 131 likewise takes place. Equally, at a fixed pressure $p_1$ a switching-off 301 of the delivery pump 111 takes place, wherein the rotating delivery pump 111 is switched off within 200 ms and comes to a halt at a fixed angle of rotation ω. Directly following this, a measurement 302 of the mean relative pressure rate $\bar{\beta}_{RL}^{static}$ of the return 160 is carried out. When the measurement 302 has been concluded, the delivery pump 111 is switched on 303 again and the pressure p in the system 100 rises. As a consequence of a query 304 it is determined when the pressure p again reaches the fixed pressure value $p_1$. In this embodiment, firstly the dosing valve 131 is now opened 305 within 200 ms and following this the delivery pump 111 switched off 306 again. Here, too, the switching-off 306 of the delivery pump 111 takes place within 200 ms and the delivery pump 111 comes to a halt at the same angle of rotation ω. The measurement 307 of the mean relative pressure rate $\bar{\beta}_{RL \ \& \ DV}^{static}$ of the return 160 and of the dosing valve 131 takes place. When the measurement 307 has been concluded, the dosing valve 131 is closed 308 again.

In a further step, a calculation 309 of a ratio V of both the mean relative pressure rates $\bar{\beta}_{RL}^{static}$ and $\bar{\beta}_{RL \ \& \ DV}^{static}$ is performed according to the Formula 10, in an analogous manner to that explained above.

$$V = \frac{\bar{\beta}_{RL}^{static}}{\bar{\beta}_{RL \ \& \ DV}^{static}} = \frac{Q_{RL}}{Q_{RL \ \& \ DV}} \qquad \text{(Formula 10)}$$

In conclusion, a checking 310 of the actual volumetric flow rate $Q_{DV}$ through the dosing valve via the calculated ratio V also takes place here and the additionally dosed-in quantity is taken into account 311 in a further dosing strategy.

Figure 6:
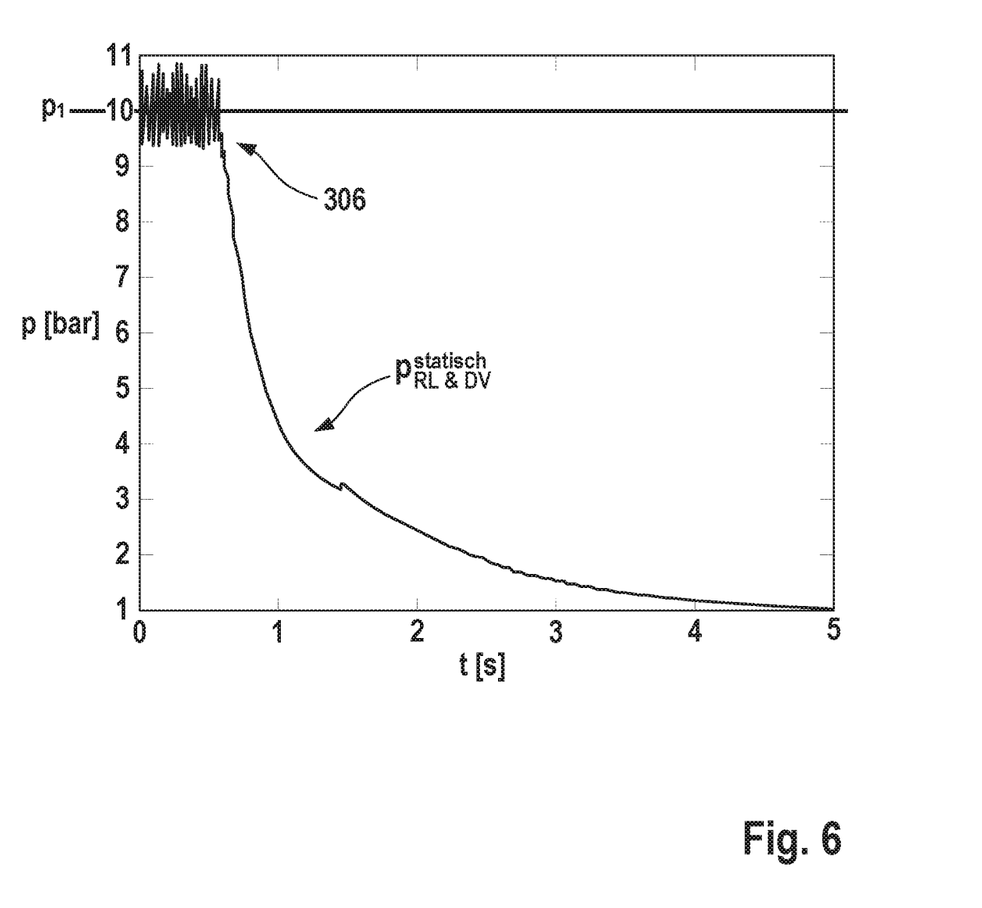
FIG. 6 shows a diagram of the pressure over the time according to an embodiment of the method according to the invention, wherein a dosing valve in the static case is open prior to the delivery pump being switched off.

FIG. 6 shows the profile of the pressure $p =_{RL \ \& \ DV}^{static}$ at which the dosing valve 131 is open 305 before the switching-off 306 of the delivery pump 111. Here, the delivery pump 111 likewise comes to a halt 306 at approximately 0.7 seconds and the pressure $p =_{RL \ \& \ DV}^{static}$ can now be reduced both via the return 160 and also via the opened dosing valve 131.

Figure 7A:
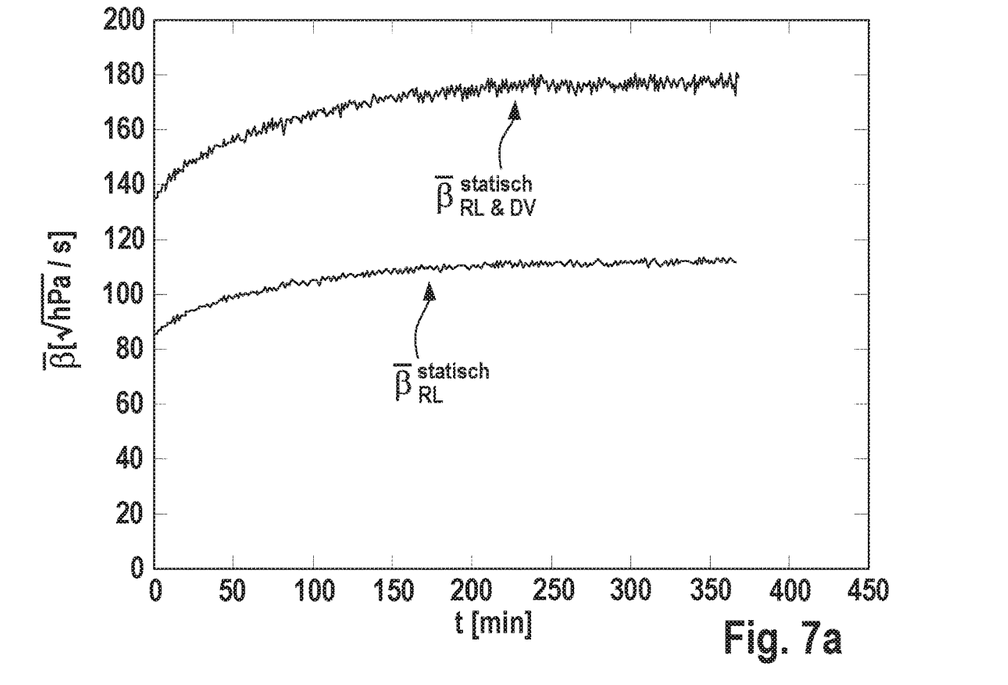
FIG. 7a shows a diagram of the mean pressure rates with closed and open dosing valve over the time according to an embodiment of the method according to the invention for the static case, in the case of which the dosing valve is not blocked.
Figure 7B:
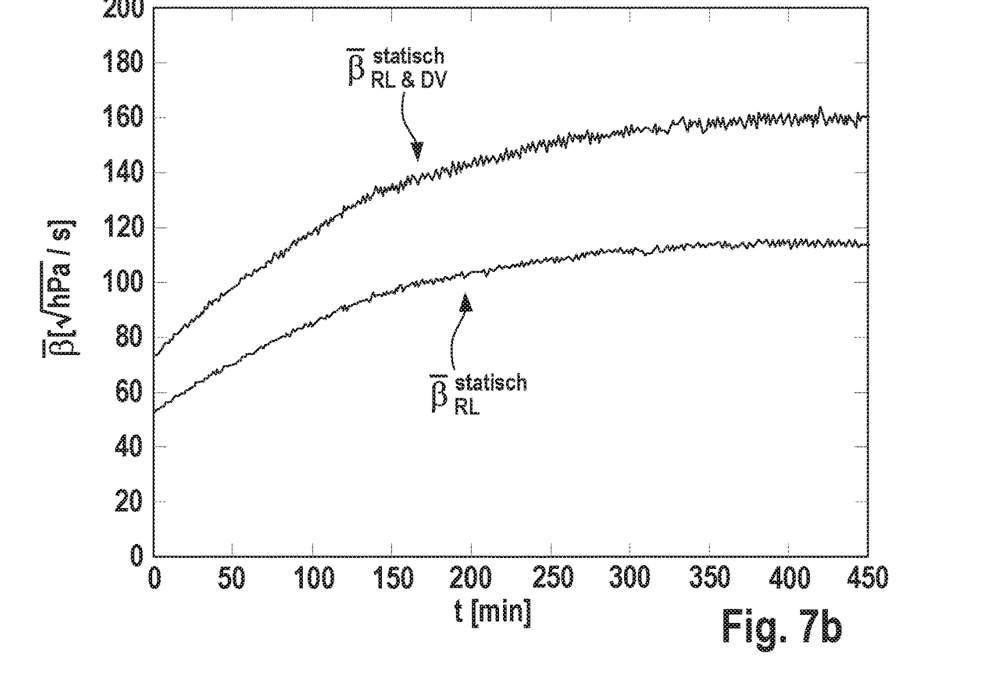
FIG. 7b shows a diagram of the mean pressure rates with closed and open dosing valve over the time according to a further embodiment of the method according to the invention for the static case, in the case of which the dosing valve is partly blocked.

In order to illustrate the change of the pressure profile, the mean relative pressure rates $\bar{\beta}_{RL}^{static}$ and $\bar{\beta}_{RL \ \& \ DV}^{static}$ are used. In FIGS. 7a and 7b, both are shown in each case for two different configurations over an extended measurement duration of approximately 7.5 hours. In particular, the dosing valve 131 in FIG. 7a is not blocked and the analysis can be carried out in the dynamic case analogous to FIG. 4a. Here it is readily evident that the mean relative pressure rate $\bar{\beta}_{RL \ \& \ DV}^{static}$ of the return 160 and of the dosing valve 131 lies above the mean relative pressure rate $\bar{\beta}_{RL}^{static}$. It is noted, furthermore, that the ratio V of the two profiles approximately coincides and lies within the expected tolerances. From this it can be inferred that the volumetric flow rate $Q_{DV}$ through the dosing valve 131 remained constant over this time and as a result the dosing did not exhibit any errors either.

FIG. 7b accordingly shows a configuration in the case of which a third of the dosing valve 131 is blocked. Furthermore, the mean relative pressure rate $\bar{\beta}_{RL \ \& \ DV}^{static}$ of the return 160 and of the dosing valve 131 lies above the mean relative pressure rate $\bar{\beta}_{RL}^{static}$ of the return 160. However, it is evident that the relative interval is smaller, which points to a lower volumetric flow rate $Q_{DV}$ through the dosing valve 131.

It should be noted that the stiffness κ and thus also the mean relative pressure rates $\bar{\beta}_{RL}^{dynamic}$, $\bar{\beta}_{RL \ \& \ DV}^{dynamic}$, $\bar{\beta}_{RL}^{static}$ and $\bar{\beta}_{RL \ \& \ DV}^{static}$ greatly depend on a charging of the system 100 with air and its runtime. For this reason, these can differ for identical dosing valves 131 and a comparison of the mean relative pressure rates $\bar{\beta}_{RL}^{dynamic}$ and $\bar{\beta}_{RL \ \& \ DV}^{static}$ with closed dosing valve 131, for example between FIGS. 4a, 4b, 7a and 7b, is not readily possible.

The invention claimed is:

1. A method for detecting a dosing error of a reduction agent in a dosing module (130), which comprises a dosing valve (131) and a first flow valve (132), of a reduction agent delivery system (100), which comprises the dosing module (130), a delivery module (110) with a delivery pump (111)

and a return (160), in which a second flow valve (161), which changes an effective cross-sectional area ($A_{eff}$) of the return (160) is arranged, comprising the following steps:

switching off (201) the delivery pump (111) at a first pressure value ($p_1$) in the reduction agent delivery system (100) when the dosing valve (131) is closed (200);

measuring (202) a first pressure rate ($\bar{\beta}_{RL}^{dynamic}$) of the second flow valve (161) of the return (160);

switching on (203) the delivery pump (111);

switching off (205) the delivery pump (111) when a pressure (p) in the reduction agent delivery system (100) has again reached (204) the first pressure value ($p_1$);

opening (206) the dosing valve (131) until the pressure (p) has fallen to a second pressure value ($p_2$);

measuring (207) a second pressure rate ($\bar{\beta}_{RL \& DV}^{dynamic}$) of the second flow valve (161) of the return (160) and of the dosing valve (131) when the dosing valve (131) is open;

calculating (209) a ratio (V) of the two pressure rates ($\bar{\beta}_{RL}^{dynamic}, \bar{\beta}_{RL \& DV}^{dynamic}$); and checking (210) an actual volumetric flow rate ($Q_{DV}$) through the dosing valve (131) with the help of the ratio (V).

2. The method according to claim 1, wherein the delivery pump (110) during both measurements (202, 207; 302, 307) is halted (201, 205; 301, 306) at the same angle of rotation (ω) when the delivery pump comprises a rotating delivery pump (110), and the delivery pump (110) performs a same stroke prior to both measurements (202, 207; 302, 307) when the delivery pump comprises a linearly driven delivery pump.

3. The method according to claim 1, wherein the second flow valve (161) in the return, which changes an effective cross-sectional area ($A_{eff}$) of the return (160), is an orifice plate (161).

4. The method according to claim 1, wherein the second flow valve (161) in the return (160), which changes an effective cross-sectional area ($A_{eff}$) of the return, is a choke.

5. The method according to claim 1, wherein the first pressure rate and the second pressure rate are is a mean relative pressure rates ($\bar{\beta}$).

6. The method according to claim 1, wherein the first pressure rate and the second pressure rate are a mean absolute pressure rates.

7. The method according to claim 1, wherein the delivery pump (111) is switched off so slowly and the dosing valve (131) opened so slowly that a pressure surge of the reduction agent is avoided.

8. The method according to claim 1, wherein an additional dosing quantity during the measurement (207; 307) of the first pressure rate and second pressure rate ($\bar{\beta}_{RL \& DV}^{dynamic}, \bar{\beta}_{RL \& DV}^{static}$) is taken into account (211; 311) in a dosing strategy.

9. A non-transitory, machine-readable storage medium storing a set of instructions that, when executed by a computer, are configured to perform the method according to claim 1.

10. A method for detecting a dosing error of a reduction agent in a dosing module (130), which comprises a dosing valve (131) and a first flow valve (132), of a reduction agent deliver system (100), which comprises the dosing module (130), a delivery module (110) with a delivery pump (111) and a return (160), in which a second flow valve (161), which changes an effective cross-sectional area ($A_{eff}$) of the return (160) is arranged, comprising the following steps:

switching off (301) the delivery pump (111) at a first pressure value ($p_1$) in the reduction agent delivery system (100) when the dosing valve (131) is closed (300);

measuring (302) a first pressure rate ($\bar{\beta}_{RL}^{static}$) of the second flow valve (161) of the return (160);

switching on (303) the delivery pump (111);

opening (305) the dosing valve (131) when a pressure (p) in the reduction agent delivery system (100) has again reached (204) the first pressure value ($p_1$);

switching off (306) the delivery pump (111);

measuring (307) a second pressure rate ($\bar{\beta}_{RL \& DV}^{static}$) of the second flow valve (161) of the return (160) and of the dosing valve (131) when the dosing valve (131) is open;

calculating (309) a ratio (V) of the two pressure rates ($\bar{\beta}_{RL}^{static}, \bar{\beta}_{RL \& DV}^{static}$); and checking (310) an actual volumetric flow rate ($Q_{DV}$) through the dosing valve (131) with the help of the ratio (V).

11. An electronic control unit (150) for detect a dosing error of a reduction agent in a dosing module (130), the dosing module comprising a dosing valve (131) and a first flow valve (132), of a reduction agent deliver system (100), the reduction agent delivery system (100) further comprising a delivery module (110) with a delivery pump (111) and a return (160) in which a second flow valve (161), which changes an effective cross-sectional area ($A_{eff}$) of the return (160), is arranged, the electronic control unit (150) configured to switch off (301) the delivery pump (111) at a first pressure value ($p_1$) in the reduction agent delivery system (100) when the dosing valve (131) is closed (300);

measure (302) a first pressure rate ($\bar{\beta}_{RL}^{static}$) of the second flow valve (161) of the return (160);

switch on (303) the delivery pump (111);

open (305) the dosing valve (131) when a pressure (p) in the reduction agent delivery system (100) has again reached (204) the first pressure value ($p_1$);

switch off (306) the delivery pump (111);

measure (307) a second pressure rate ($\bar{\beta}_{RL \& DV}^{static}$) of the second flow valve (161) of the return (160) and of the dosing valve (131) when the dosing valve (131) is open;

calculate (309) a ratio (V) of the first pressure rate and second pressure rate ($\bar{\beta}_{RL}^{static}, \bar{\beta}_{RL \& DV}^{static}$); and check (310) an actual volumetric flow rate ($Q_{DV}$) through the dosing valve (131) with the help of the ratio (V).

* * * * *